Dec. 11, 1951  G. L. AUSTIN ET AL  2,578,033
POST HOLE AUGER
Filed Nov. 8, 1946  3 Sheets-Sheet 2
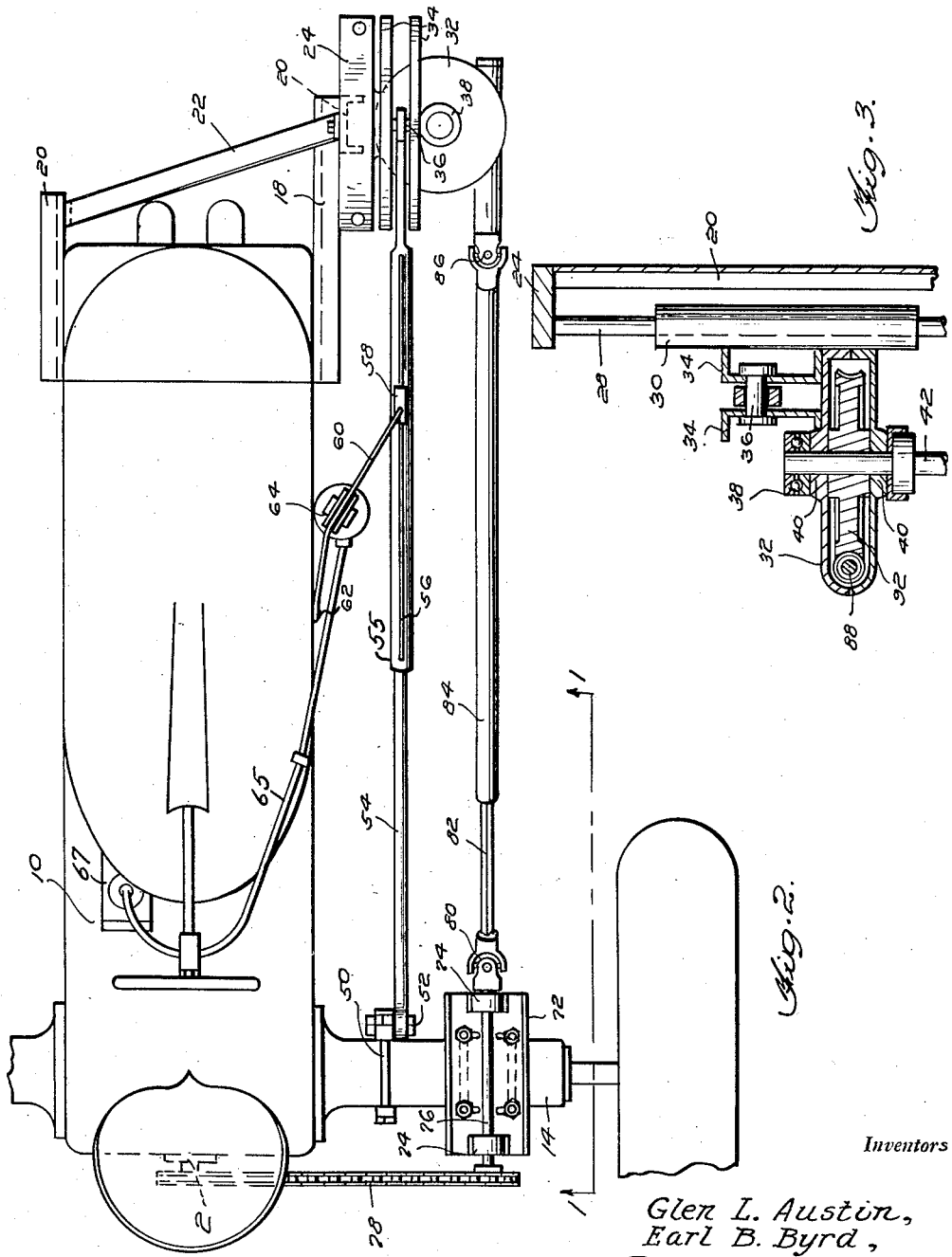
Inventors
Glen L. Austin,
Earl B. Byrd,
By Clarence A. O'Brien
and Harvey B. Jacobson
Attorneys Dec. 11, 1951  G. L. AUSTIN ET AL  2,578,033
POST HOLE AUGER
Filed Nov. 8, 1946  3 Sheets-Sheet 3
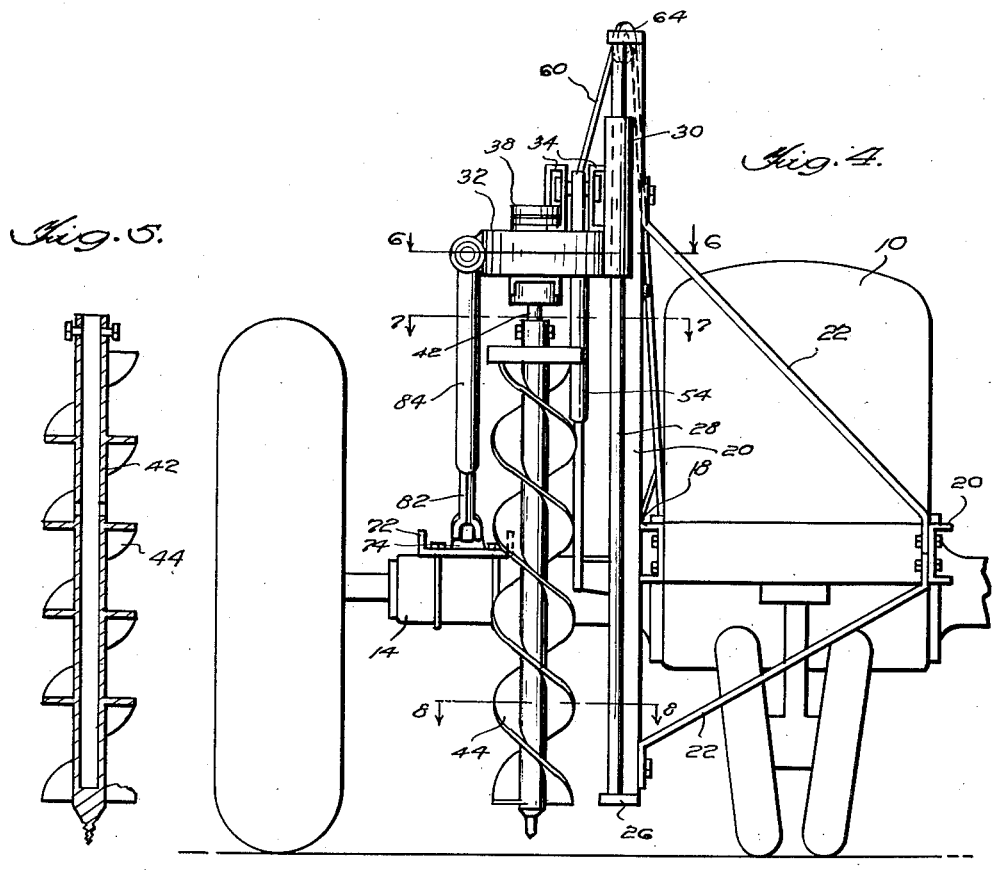
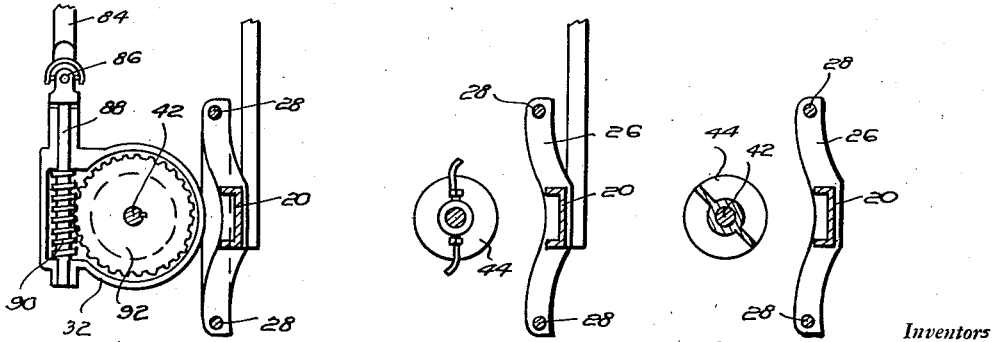
Inventors
Glen L. Austin
Earl B. Byrd,
By
Attorneys Patented Dec. 11, 1951

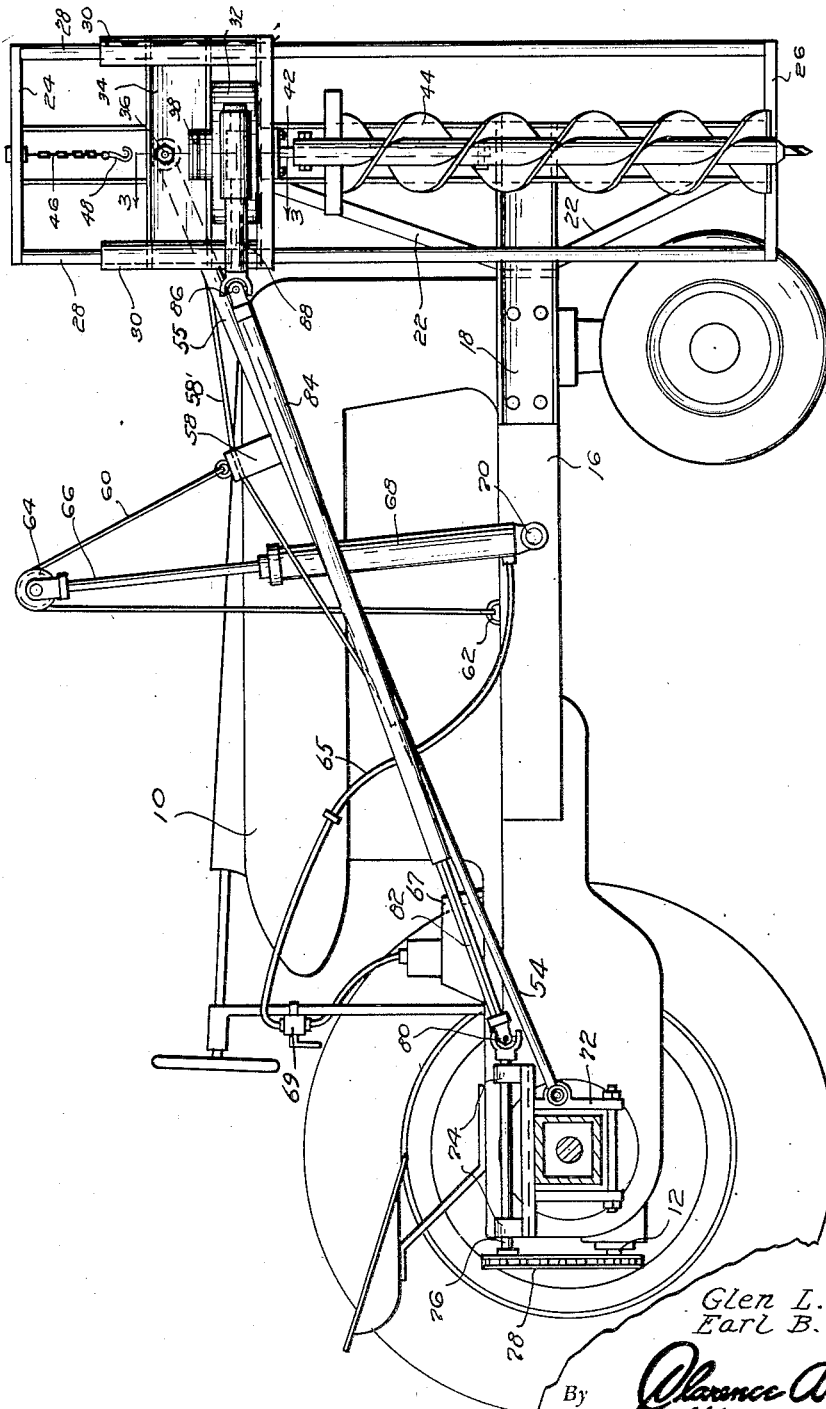

2,578,033

UNITED STATES PATENT OFFICE 2,578,033

POSTHOLE AUGER

Glen L. Austin and Earl B. Byrd, Happy, Tex.

Application November 8, 1946, Serial No. 708,670

4 Claims. (Cl. 255—19)

The present invention relates to novel and useful improvements in a post hole auger and more specifically pertains to an attachment for expeditiously drilling post holes which may be attached to and operated by a conventional type of farm tractor.

The principal objects of this invention reside in providing a device which may be quickly and easily attached to any conventional type of farm tractor; which is adapted to quickly and easily drill post holes; which is operated by the power take-off means of the tractor; which is guided in its operating movement by a novel and efficient guide and bracing means conveniently carried by the tractor; wherein the means directly applying the power of operation to the auger is carried by the latter and reciprocated therewith during the operation of the auger; and wherein the auger is guided for rectilinear motion throughout its path of travel.

Further objects of the invention reside in providing a device which is generally of lightweight in construction, strong and durable as to its intended use; which when installed upon a tractor is compact and does not interfere with the visibility of the operator of the tractor; and which is extremely efficient for the purposes intended.

These, together with various ancillary objects of the invention which will later become apparent as the following description proceeds, are realized by this device, one embodiment of which has been illustrated, by way of example only, in the accompanying drawings, wherein:

Figure 1 is a side elevational view showing the device mounted upon a conventional type of tractor;

Figure 2 is a top plan view of the device of Figure 1;

Figure 3 is a detail view in vertical section through the driving means of the auger, and is taken substantially upon the section line 3—3 of Figure 1;

Figure 4 is a front elevational view of the tractor showing the device mounted thereon;

Figure 5 is a central vertical sectional view through the auger of the device;

Figure 6 is a detail view in horizontal section taken substantially upon the section line 6—6 of Figure 4;

Figure 7 is a detail view in horizontal section taken substantially upon the line 7—7 of Figure 4; and, Figure 8 is a detail view in horizontal section taken substantially upon the line 8—8 of Figure 4.

Referring now more particularly to the accompanying drawings, wherein like numerals indicate similar parts throughout the several views, 10 designates a conventional type of farm tractor which is provided with the customary type of power take-off 12, a rear axle housing 14 and side frame members 16.

Detachably extending forwardly from the front end of the side frame members 16, are a pair of supporting plates 18 and 20 upon which is mounted the auger bit and its transmission mechanism to be later set forth. A channel iron vertical support 20 is secured upon the outer side of the supporting member 18, and is rigidly braced and secured to the frame of the tractor as by reinforcing bars 22. The member 20 is provided with upper and lower plates 24 and 26 constituting cap portions and between which extend a pair of parallel, vertically disposed guide rods 28.

Slidably disposed upon the rods 28, are a pair of sleeves or bushings 30 rigidly attached and extending laterally between the sleeves 30, is a transmission casing 32 and a supporting bracket consisting of a pair of angle irons 34 between which is secured a supporting pin or shaft 36 for a purpose to be later set forth. Journaled vertically in the casing 32 as by means of ball bearings 38 and journal bearings 40, is the arbor or stem 42 of an auger bit 44 of any suitable size, shape or construction. It will thus be seen that as the casing 32 is reciprocated by means of the guide sleeves 30 upon the guide rods 28, the auger bit 44 is raised or lower as desired.

In order to secure the auger bit in its raised position, and to render the same inoperative as when transporting the device from one place to another by means of the tractor, a chain 46 with a hook 48 depends from the head piece 24 and is adapted to engage the support pin 36. In order to raise or lower the auger as desired, the following mechanism is employed. A split clamp or the like 50 is detachably secured in any desired manner upon the axle housing 14 of the tractor, and has pivoted thereto as at 52, a rod 54 of a telescopic member which also includes a tubular portion 55 whose other end pivotally engages the lifting pin 36. Adjacent its upper end, the tubular portion 55 is longitudinally slotted as at 56 and slidably receives a follower 58 which extends through the slot 56 and is retained therein by means of a flexible tie member 58' affixed to the tubular member 55. A cable 60 is rigidly attached to the upper end of the follower 58 and has its other end secured as at 62 to a convenient portion of the frame 16 of the tractor. The cable is entrained over a pulley 64 mounted upon the upper end of a piston rod 66 whose piston, not shown, is slidably received in a hydraulic cylinder 68 pivoted as at 70 at any suitable point to the frame 16 of the tractor.

Any suitable hydraulic means may be provided for operating the piston rod 66 and pulley 64, to thereby raise or lower the telescopic member 54, 55 and thereby elevate or drop the auger bit 44. Such a means may be a conduit 65 secured at one of its ends to the cylinder 68 and at its other end to a conventional fluid pressure supply 67 suitably mounted on the tractor, a conventional valve 69 being operatively connected in the conduit 65 for selectively admitting and releasing fluid pressure in the cylinder 68.

As shown best in Figures 1 and 2, a clamp 72 is detachably secured upon the rear axle housing 14, and suitably journals as at 74 a lay shaft 76 which is connected as by a sprocket chain 78 to the power take-off 12 of the tractor.

The shaft 76, extends beyond the support bracket or housing 72, and is suitably connected as by a universal joint 80 with a driving shaft 82 preferably of square cross section, which is slidably but non-rotatably received in the correspondingly shaped internal passage of a sleeve 84 which is attached as by a universal joint 86 with a driving shaft 88 journaled in the transmission casing or housing 32 hereinbefore mentioned. As shown more clearly in Figure 6, the shaft 88 is provided with a worm gear 90 which is constantly in mesh with a pinion 92 splined upon the upper end of the auger or shaft 42 of the auger bit.

By means of the foregoing construction, it will be seen that a positive driving connection is provided upon the power take-off of the tractor to rotate the auger bit; and that this positive driving connection is maintained despite the raising or lowering of the auger bit by means of the telescoping driving shafts 82 and 84, and the universal joint connections 80 and 86. By means of the casing 32, the driving connection of the worm gear 90 and the pinion 92 may be maintained in an oil bath if desired, and is protected against dust or dirt during its operation.

From the foregoing, it is believed that the construction and operation of the device will be now apparent. Power means, operated by the tractor are provided for rotating the auger bit, while other power operated means from the tractor hydraulic power take-off, are provided for raising and lowering the auger as the exigencies of the situation require. Further, a safety means is provided for locking or retaining the auger at its elevated position as when moving the device to other locations. Particular attention is directed to the fact that the entire attachment may be readily removed from or applied to conventional type of farm tractor, and that the auger bit is guided in its vertical travel during the drilling of a post hole or in raising the auger bit thereafter.

Since various modifications of the invention will readily occur to those skilled in the art, the accompanying drawings and description are to be regarded as illustrative only of the principles of the invention, and suitable modifications may be resorted to within the scope of the appended claims.

What we claim as new is:

1. A post hole digging auger attachment for tractors having a power take-off means adjacent the rear end thereof consisting of a frame detachably mounted upon the front of a tractor, guides carried by said frame, a carriage vertically reciprocable upon said guides, an auger bit rotatably supported by said carriage, power means for raising and lowering said carriage, said power means including a telescopic rod and tubular member, said rod being pivotally connected to the rear end of said tractor and said tubular member being pivotally connected to said carriage, hydraulically operated means for raising and lowering said telescopic member consisting of a cylinder pivotally attached to the frame of the tractor intermediate its ends, a piston and piston rod reciprocably mounted in said cylinder, a pulley carried by said piston rod, a cable entrained over said pulley and connected at one end to said tractor frame, said tubular member having a longitudinal slot therein, a follower member slidably mounted in said slot, said other end of said cable being affixed to said follower member, a flexible tie member affixed at each end to the ends of said tubular member and engageable with the upper portion of said follower member to retain same in said longitudinal slot, and driving means connected to said power take-off and said carriage for rotating said auger bit.

2. The combination of claim 1 and fastening means mounted on said carriage and said frame for retaining said carriage and auger bit in its elevated position.

3. The combination of claim 1 wherein said last mentioned means includes a gear casing formed in said carriage, a pinion gear in said casing, said auger bit being connected to said pinion gear, a worm gear in said casing meshing with said pinion, a bracket mounted on the rear axle housing of a tractor, a lay shaft journaled in said bracket, means drivingly connecting said lay shaft to said power take-off of said tractor, and telescoping driving shaft connecting said lay shaft and said worm gear and constituting said driving means, said telescoping driving shaft including an element secured to said lay shaft by a universal joint and a second element secured to said pinion by a universal joint.

4. The combination of claim 3 and fastening means mounted on said carriage and said frame for retaining said carriage and auger bit in its elevated position.

GLEN L. AUSTIN.
EARL B. BYRD.

REFERENCES CITED

The following references are of record in the file of this patent:

UNITED STATES PATENTS

| Number | Name | Date |
|---|---|---|
| 1,271,904 | Jones | July 9, 1918 |
| 1,507,776 | Humiston | Sept. 9, 1924 |
| 1,602,375 | Gibson | Oct. 5, 1926 |
| 2,320,775 | Garner | June 1, 1943 |
| 2,321,680 | Houston | June 15, 1943 |